L. J. HUNT.
ALTERNATING CURRENT DYNAMO ELECTRIC MACHINE.
APPLICATION FILED MAR. 14, 1914.
1,160,717.
Patented Nov. 16, 1915.
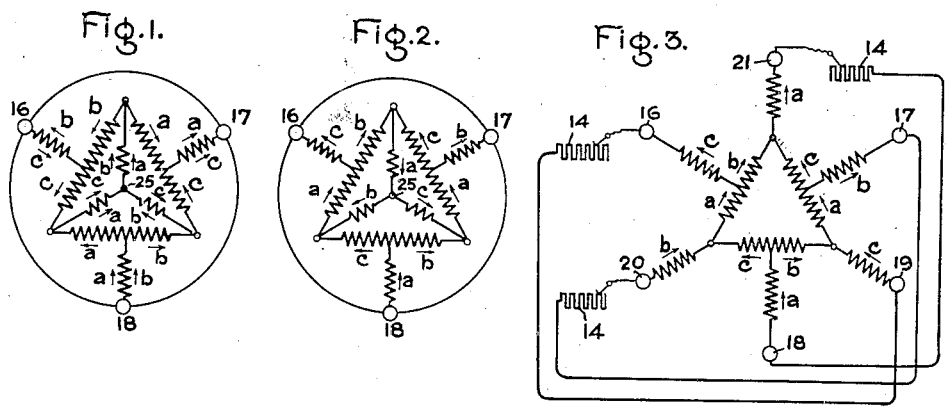
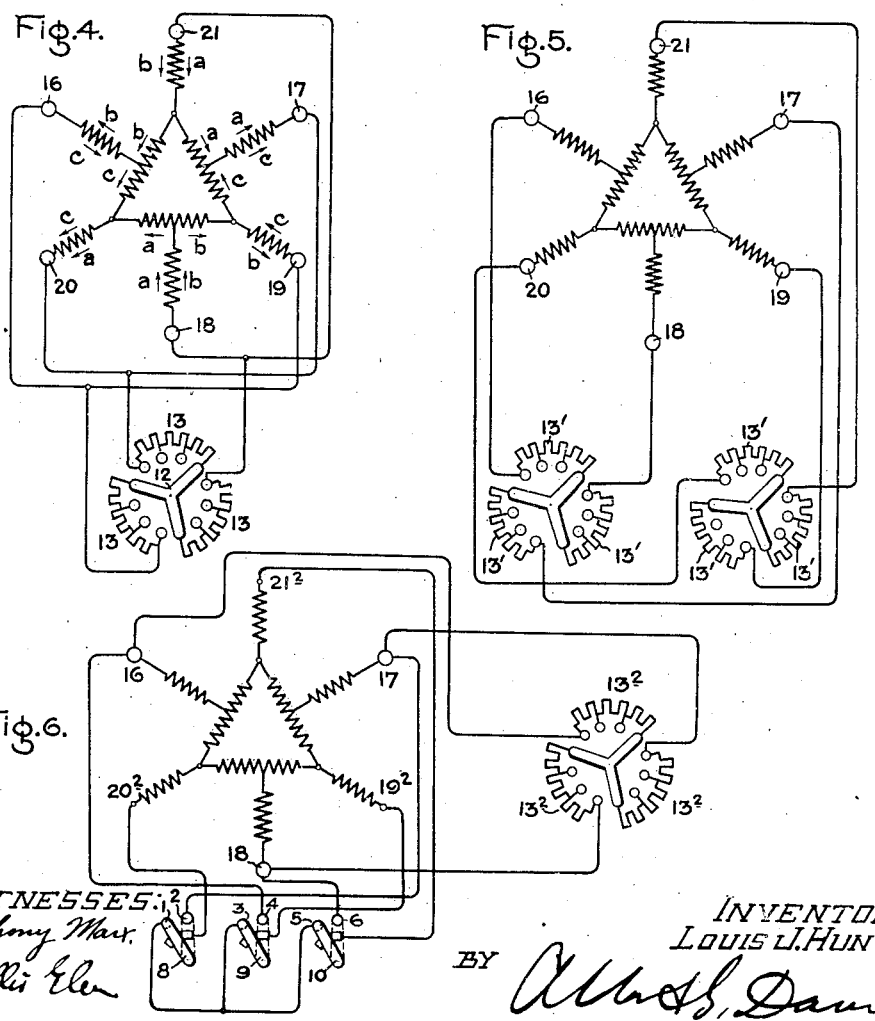
WITNESSES:
Anthony Mair.
J. Ellis Glen
INVENTOR:
LOUIS J. HUNT,
BY
HIS ATTORNEY.

UNITED STATES PATENT OFFICE.

LOUIS J. HUNT, OF SANDYCROFT, WALES, ASSIGNOR TO GENERAL ELECTRIC COMPANY, A CORPORATION OF NEW YORK.

ALTERNATING-CURRENT DYNAMO-ELECTRIC MACHINE.

1,160,717.  Specification of Letters Patent.  Patented Nov. 16, 1915.

Application filed March 14, 1914. Serial No. 824,693.

*To all whom it may concern:*

Be it known that I, LOUIS J. HUNT, a subject of the King of Great Britain, residing at Sandycroft, in the county of Flint, in the Principality of Wales, have invented certain new and useful Improvements in Alternating-Current Dynamo-Electric Machines, of which the following is a specification.

This invention relates to the windings of alternating-current dynamo-electric machines of the type described in the specification of my Reissue Patent No. 13,591, dated July 8, 1913. In the said specification, windings are described suitable for use for instance on the armature of an electric motor, while the field is provided with windings adapted to be connected and supplied with current so as to give rotating fields with different numbers of poles. The armature windings are connected to three slip-rings, and when these slip-rings are short-circuited the flow of the currents in the armature windings is such that a field is produced having $2x$-poles; if the slip-rings are open-circuited, however, the flow of the currents in the armature is different, and an additional field of $x$-poles is produced rotating, say, in the opposite direction from the $2x$-pole field. These two fields in the armature react with the field windings to produce a "cascade" effect, and the speed of the motor then corresponds to a winding having as many poles as the sum of the two numbers, that is to say $3x$-poles. The winding described in that specification, when the slip-rings are connected together, will serve also without alteration as an $x$-pole winding if the field windings produce an $x$-pole main field.

My present invention has for its object a further improvement of the armature windings of such a machine, whereby the circulation of local currents or the unbalancing of the currents in the armature windings is prevented when the machine is operating at a speed considerably below synchronism with either an $x$-pole or a $2x$-pole field.

My invention will best be understood from the following description taken in connection with the accompanying drawing, in which—

Figures 1 and 2 are key diagrams showing the flow of currents in an armature winding of the type described in my reissue patent above referred to; Fig. 3 is a diagram of an armature winding embodying my invention; Fig. 4 is a modification of the diagram of Fig. 3; and Figs. 5 and 6 show further diagrams embodying my invention.

Like letters of reference are used throughout the specification and the several figures of the drawing to denote like parts.

My invention relates to an alternating-current motor having armature and field members with windings on each member adapted to give two different basal number of poles for cascade working, the windings on one member, preferably the rotor, comprising mesh connected windings, windings connected to the points of the mesh and windings connected to the mid points of the mesh.

In my prior patent above referred to, the windings connected to the points of the mesh are directly connected together in star relation. Fig. 1 shows the flow of currents in the armature of such a motor, as for instance that shown in Figs. 11 to 14 of said patent, when the armature is operating with a field of $x$-poles. The same convention with regard to the letter $a$ as indicating currents of the maximum value and the letters $b$ and $c$ as indicating currents of half the maximum value at a particular instant, is adopted in the drawing, as in the prior patent.

By connecting the slip-rings marked 16, 17, 18 through variable resistances, the motor can be caused to run below synchronism when working either with an $x$-pole or a $2x$-pole field. The insertion of these resistances, however, permits local currents to flow, particularly when the speeds are much reduced, in those parts of the windings, which are the parts wherein the currents alone flow when the slip-rings are open-circuited. These local currents produce an additional magnetic field which may induce E. M. F.'s in the field windings. Usually this effect is of no moment, but in some cases a high voltage may be induced in the field windings and in any case, if a second magnetic field is produced the magnetizing current of the motor will be increased and the power factor reduced.

The principal object of the present invention is to provide means to prevent the circulation of these local currents or the unbalancing of the currents in the armature windings.

Fig. 2 of the drawings corresponds with Fig. 14 of the drawings of the patent above referred to, which shows the flow of the currents at a given instant in the armature winding when the slip-rings are short-circuited, and when the field windings are connected for $2x$-poles. It will be seen that when the armature windings are acted upon by a field of $2x$-poles, the directions of flow of the currents from the neutral point 25 are opposite to the directions of flow of the currents from the slip-rings to the windings. It is also obvious that local currents can circulate in the parts of the windings forming closed circuits in themselves apart from the connection of the slip-rings, if the conditions are such as to induce these local currents. The circulation of local currents through the parts of the windings connected to the star or neutral point 25 are prevented by my invention. In accordance therewith, these parts of the windings are opened out and resistances are preferably inserted in the circuits of these windings and the windings connected to the slip-rings, so that the flow of currents in these parts of the windings also can be controlled.

Fig. 3 shows a modification in accordance with my present invention of the windings of Figs. 1 and 2, wherein the ends of the windings connected to the points of the mesh are opened out and connected instead to slip-rings 19, 20 and 21. Then, the slip-rings 16 and 19, 17 and 20, 18 and 21, are connected together in pairs through resistances 14, so that instead of the currents flowing as shown in Fig. 2, currents in the same phase flow from one slip-ring to the other through resistances, and no opportunity is given for the circulation of the local currents. In order to regulate the speed of the motor the resistances are cut out in steps, so that the circuits are always balanced, and at synchronous speed the resistances are cut out of circuit entirely, so that the connections are again equivalent to those of Fig. 2.

Fig. 4 is a diagram showing how the connections must be made when 6 slip-rings are used as in Fig. 3, but when the armature is working with a field of $x$-poles, the connections in Fig. 3 are not suitable for this purpose, as is obvious, because the directions of flow of the currents in the windings from the neutral point 25 are the same as those of the currents in the same phases in the parts of the windings connected to the slip-rings. Hence, the pairs of slip-rings which were previously connected together as in Fig. 3, are in this case short-circuited, and resistances 13 are connected between the three pairs of slip-rings through a star connecting switch 12, by which the resistances 13 can be cut out gradually.

The flow of the currents may not be in practice exactly as indicated in Figs. 3 and 4 by the letters $a$, $b$ and $c$, indicating instantaneous values, because there may be other disturbing effects at speeds differing substantially from synchronous speeds. The use of these letters, however, is convenient in explaining the object of the change of connections, and the way in which it operates to prevent the flow of the local currents which it is the object of this invention to prevent.

Instead of using resistances connected between the slip-rings as at 14, in the arrangement of Fig. 3, it may be preferable to use two sets of three star-connected resistances 13′ with a machine having six slip-rings, the one star-connected resistance having its terminals connected to the brushes of the slip-rings 16, 17 and 18, while the other is similarly connected to the brushes of slip-rings 19, 20 and 21. The flow of the currents in the winding will be the same as in Fig. 3, and the same resistances could then be used for working with the windings connected either for $2x$ or for $x$-poles. Such an arrangement is shown in Fig. 5.

In some cases the local currents with windings connected as in Figs. 1 and 2 are only found to be at all serious when the currents are flowing to produce an $x$-pole field as in Fig. 1. Hence, it is often quite unnecessary to arrange for the neutral connection 25 to be opened out when the rotor is acted upon by a $2x$-pole field in the field member. Advantage may be taken of this to obviate the necessity of using so many slip-rings, and a switch mounted on the armature may be arranged to make the necessary change of connections so that only three slip-rings are actually needed. Fig. 6 is a diagram showing how this may be done. The parts of the windings, which in Figs. 1 and 2 were shown connected to the neutral point 25, are now connected to three switches 8, 9 and 10, which are indicated diagrammatically, but may consist of any convenient forms of circuit closing members which can be mounted on the armature, and operated simultaneously, for instance by longitudinal movement imparted to a collar on the shaft. The slip-rings 16, 17 and 18 are connected to contacts 4, 2 and 6, which the switches may engage in one position. Contacts 1, 3 and 5 are connected together. In the position of the switches shown in full lines in Fig. 6, the ends 19², 20² and 21² of the windings previously connected to the neutral point 25 are short-circuited by the switches, while the slip-rings 16, 17 and 18 are open-circuited, and the speed may be controlled through brushes with resistances 13² connected thereto working on the slip-rings. This is the condition of affairs when the machine is to work with a $2x$-pole field. If the machine is to work with an $x$-pole field, however, the switches 8, 9 and 10 are moved over on to the contacts 2, 4 and 6, whereupon the connections of Fig. 4 are reproduced, if the brushes working on the slip-rings are connected through resistances 13².

It will be evident that the invention is applicable to machines of any convenient numbers of poles as set out in the specification of my Reissue Patent No. 13,591, and if the windings are repeated so that there are two or more star connections, such as 25, each of these star connections may be treated in the way described above, the opened-out ends carrying currents in the same phase being connected to the same slip-ring. Finally, I desire it to be understood that my invention is not limited to a motor, the windings of which are arranged to be connected in concatenation, and that it may be used in a two-speed motor, the armature of which is adapted to run at either one or another speed corresponding to the basal numbers of poles of the field windings, and I aim in the appended claims to cover all such and other modifications which do not depart from the spirit and scope of my invention.

What I claim as new and desire to secure by Letters Patent of the United States, is,—

1. An alternating current electric motor having armature and field members, windings on each member adapted to give two different basal number of poles for cascade working, the windings on one member comprising mesh connected windings, windings connected to the points of the mesh and windings connected to the mid points of the mesh, resistances, and means for introducing said resistances in the circuits of said windings connected to the mesh.

2. An alternating current electric motor having armature and field members, windings on each member adapted to give two different basal number of poles for cascade working, the windings on one member comprising mesh connected windings, windings connected to the points of the mesh and windings connected to the mid points of the mesh, means for connecting the free ends of said windings connected to the mesh in pairs.

3. An alternating current electric motor having armature and field members, windings on each member adapted to give two different basal number of poles for cascade working, the windings on one member comprising mesh connected windings, windings connected to the points of the mesh and windings connected to the mid points of the mesh, means for connecting the free ends of said windings in the same phase and connected to the mesh in pairs.

4. An alternating current electric motor having armature and field members, windings on each member adapted to give two different basal number of poles for cascade working, the windings on one member comprising mesh connected windings, windings connected to the points of the mesh and windings connected to the mid points of the mesh, means for connecting the free ends of said windings connected to the mesh in pairs, resistances connecting each pair of the ends of the windings to a star connection, and means for cutting out said resistances until all of the ends of said windings are short-circuited, whereby the speed of said motor is controlled.

5. An alternating current electric motor having armature and field members, windings on each member adapted to give two different basal number of poles for cascade working, the windings on one member comprising mesh connected windings, windings connected to the points of the mesh and windings connected to the mid points of the mesh, means for connecting the free ends of said windings in the same phase and connected to the mesh in pairs, resistances connecting each pair of the ends of the windings in star connection, and means for cutting out said resistances until all of said ends are short-circuited, whereby the speed of said motor is controlled.

6. An alternating current electric motor having armature and field members, windings on each member adapted to give two different basal number of poles for cascade working, the windings on one member comprising mesh connected windings, windings connected to the points of the mesh and windings connected to the mid points of the mesh, resistances, means for introducing and cutting out said resistances in the circuits of the windings connected to the mid points of the mesh, and means for connecting the windings connected to the points of the mesh in star relation and for connecting in pairs the free ends of said windings in the same phase and connected to the mesh.

7. An alternating current electric motor having armature and field members, windings on each member adapted to give two different basal number of poles for cascade working, the windings on one member comprising mesh connected windings, windings connected to the points of the mesh and windings connected to the mid points of the mesh, resistances, means for introducing and cutting out said resistances in the circuits of said windings connected to the mid points of said mesh, and a switch for connecting the windings connected to the points of the mesh in star relation, when the motor is operating at a speed corresponding to a $2x$-pole stator field, and for connecting in pairs the free ends of said windings in the same phase and connected to the mesh, when the motor is operating at a speed corresponding to an $x$-pole stator field.

In witness whereof, I have hereunto set my hand this third day of March, 1914.

LOUIS J. HUNT.

Witnesses:
 JOHN DAY,
 ROY G. KILBURNE.